Patented Apr. 28, 1925.

1,535,656

UNITED STATES PATENT OFFICE.

GUSTAV EGLOFF, OF CHICAGO, ILLINOIS, ASSIGNOR TO UNIVERSAL OIL PRODUCTS COMPANY, OF CHICAGO, ILLINOIS, A CORPORATION OF SOUTH DAKOTA.

PROCESS FOR TREATING ACID-SLUDGE OILS.

No Drawing. Application filed May 16, 1921, Serial No. 470,034. Renewed January 3, 1925.

*To all whom it may concern:*

Be it known that I, GUSTAV EGLOFF, a citizen of the United States, residing in the city of Chicago, county of Cook, and State of Illinois, have invented certain new and useful Improvements in Processes for Treating Acid-Sludge Oils, of which the following is a specification.

This invention relates to improvements in process of treating acid sludge oils and refers more particularly to the pressure distillation of such oils. The acid sludge oils in question result from the acid treatment of such substances as gasoline, kerosene or lubricating oil constituents from the refining of petroleum oil, coal tars or shale oils.

The process is particularly adapted to recovering in an economical manner a maximum amount of the sulphuric acid, as well as certain light hydro-carbon oils. In addition, the use of the pressure distillation tends to permit recovery of such acids as sulfonic acid, having marked stability. In other words, by means of the pressure distillation, not only will a larger percentage of these constituents be recovered, but because of the heat and pressure to which the sludge oil is subjected, certain new acids or oily constituents, or both, are formed in more or less degree.

The process may be carried out as follows:
A still capable of withstanding 100 lbs. to several hundred pounds pressure may be used, and if desired, not only the still but the condenser connected with the vapor space of the still may also be maintained under pressure. Using a pressure of say 50 pounds on both still and condenser, the contents of the still may be heated to a temperature gradually increased to upwards of 600° F. The sulphuric acid and sulfonic acid constituents, as well as other acid constituents, as, for example, sulphur dioxide, will pass out of the still into the condenser. Also certain of the light oils may pass out of the still as vapors to the condenser. The sulphuric acid and oil constituents will separate by gravity in the receiver and may be separately collected. By suitably cooling the contents of the receiver, the sulfonic acid will separate out from the sulphuric acid and oily constituents. The sulphur dioxide may be passed to a suitable gas container, and, if desired, converted to sulphuric acid. There will be left in the still a coky-like or asphaltic-like residue from which has been freed the acid and light oil constituents.

I claim as my invention:

1. A process of treating acid sludge oils consisting in distilling said oil under a pressure, removing from the still as vapors the sulphuric and other acid constituents and certain light oils, condensing and then separating and collecting them.

2. A process of treating acid sludge oil consisting in distilling the oil under pressure and removing as vapors certain of the acid constituents thereof, as, for example, sulphuric and sulfonic acid, condensing and then separating and independently collecting them.

3. A process of treating acid sludge hydrocarbons, consisting in subjecting the same to a distilling temperature under a superatmospheric pressure, discharging from the still as vapors sulphuric and other acid constituents and light oil fractions, in condensing and in collecting said condensed vapor constituents.

GUSTAV EGLOFF.